Patented Feb. 13, 1923.

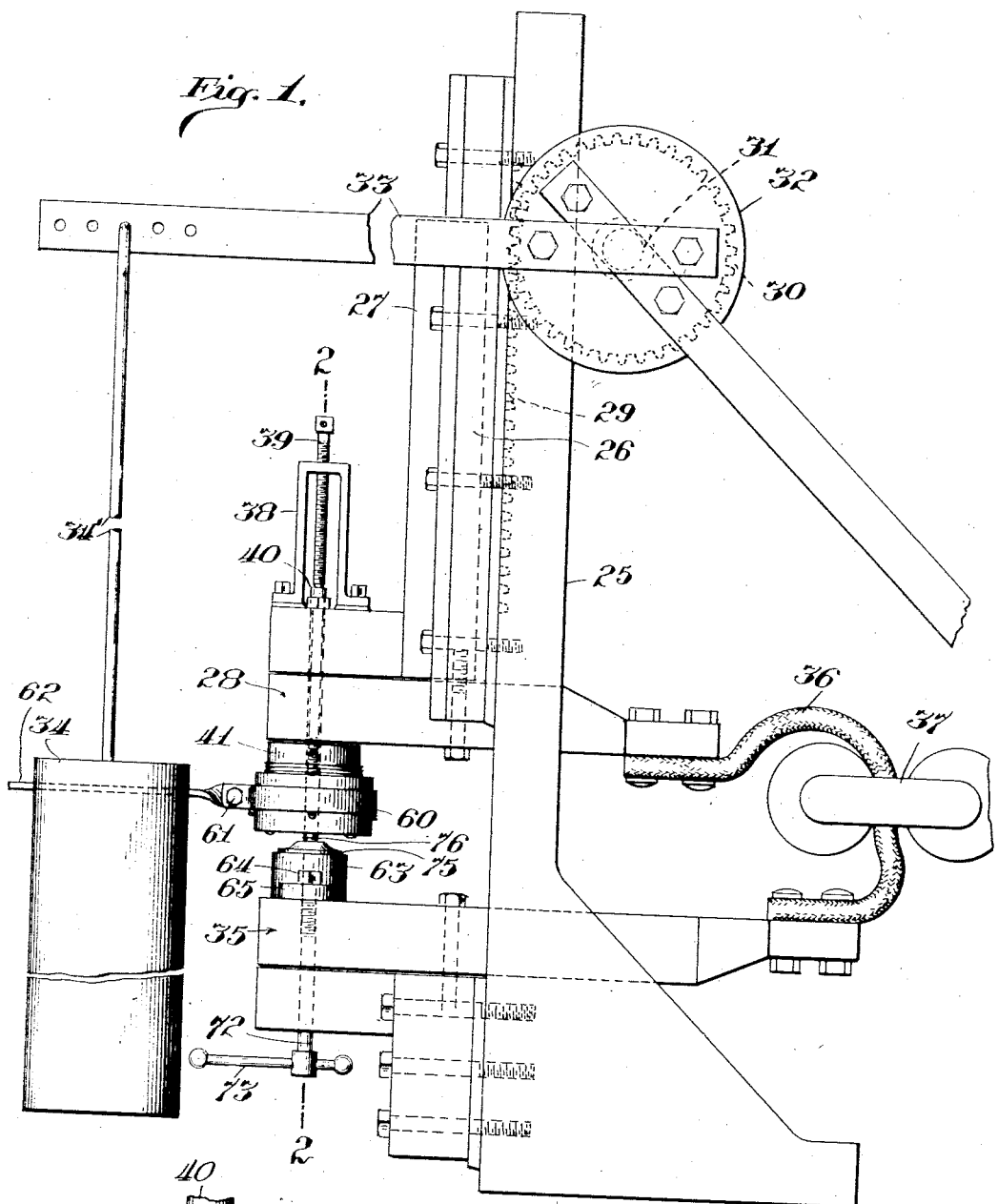

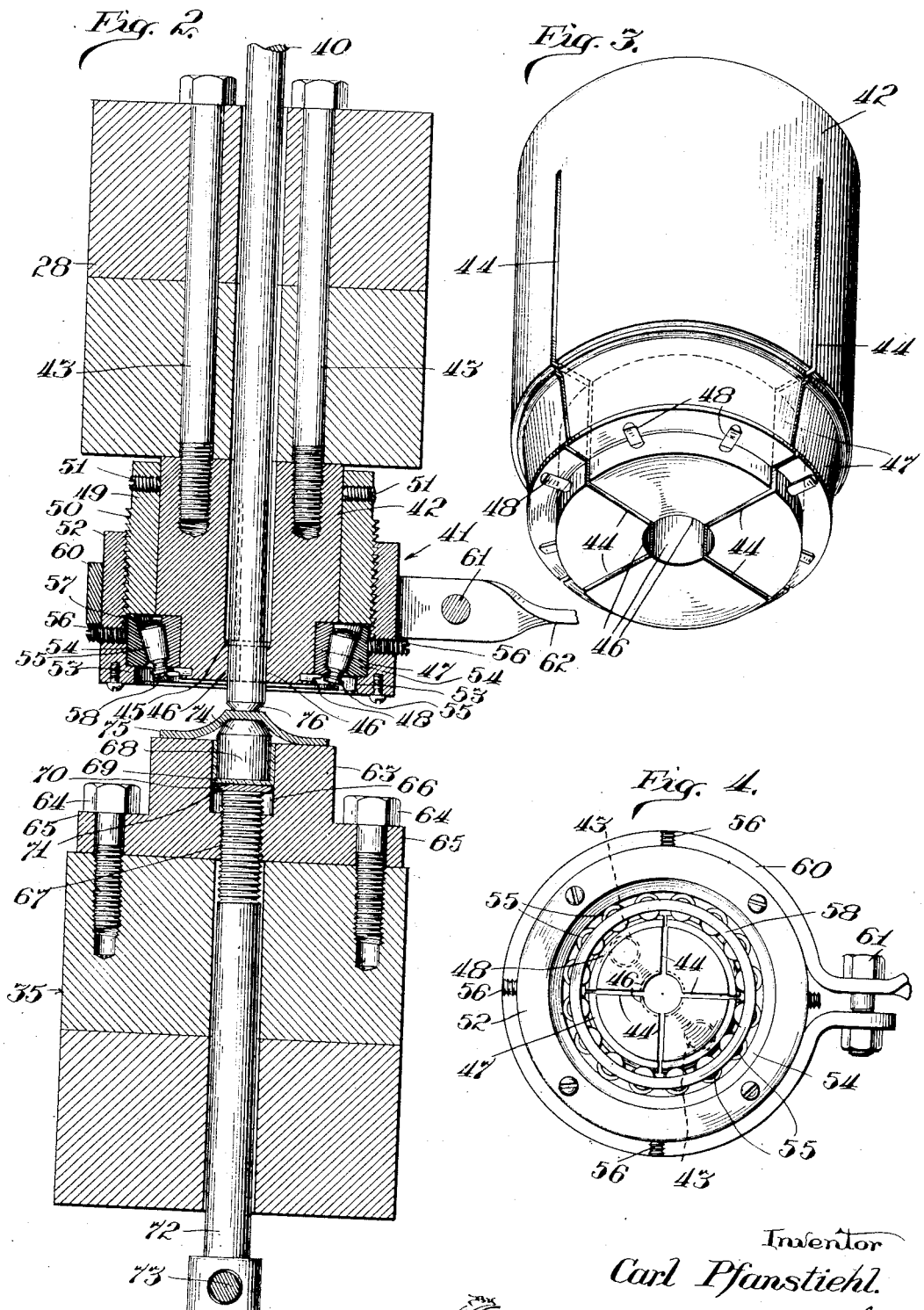

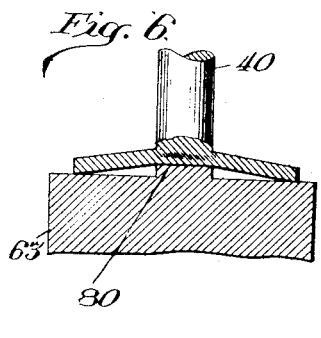
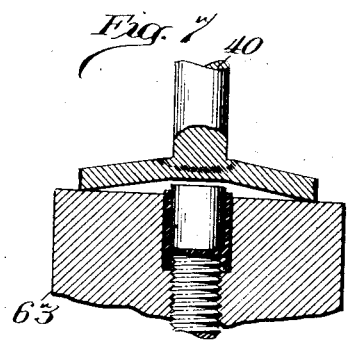
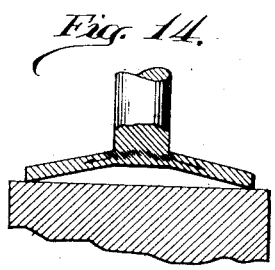
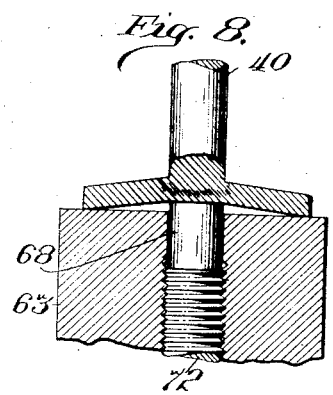
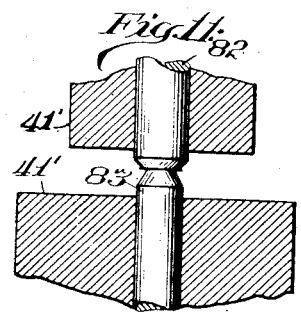
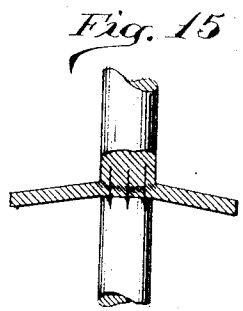
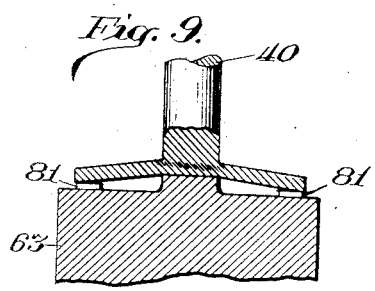
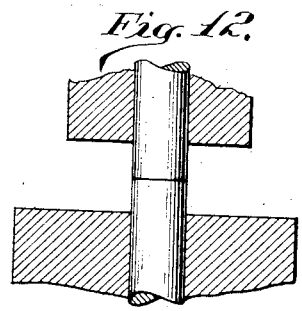
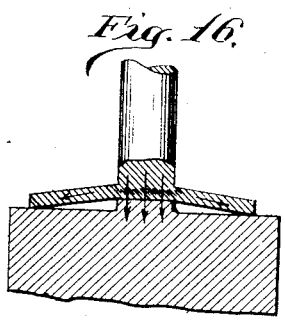
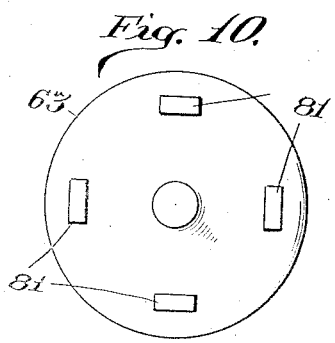
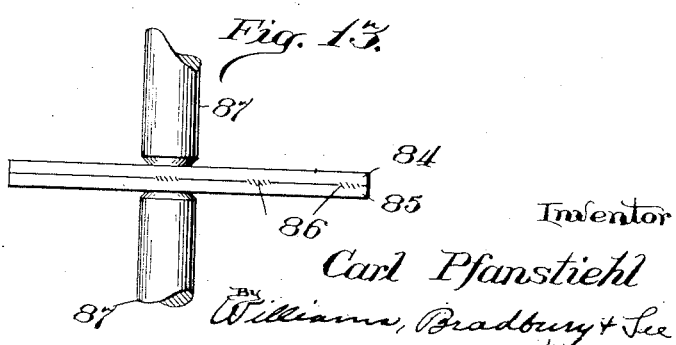

1,445,411

UNITED STATES PATENT OFFICE.

CARL PFANSTIEHL, OF HIGHLAND PARK, ILLINOIS, ASSIGNOR TO FANSTEEL PRODUCTS COMPANY, INC., OF NORTH CHICAGO, ILLINOIS, A CORPORATION OF NEW YORK.

PROCESS OF MAKING VALVES.

Continuation of applications Serial Nos. 138,780, filed December 26, 1916, and 209,858, filed January 2, 1918. This application filed February 10, 1919. Serial No. 276,044.

*To all whom it may concern:*

Be it known that I, CARL PFANSTIEHL, a citizen of the United States, residing at Highland Park, in the county of Lake and State of Illinois, have invented a certain new and useful Process of Making Valves, of which the following is a full, clear, concise, and exact description, reference being had to the accompanying drawings, forming a part of this specification.

My invention relates to a new article of manufacture and method for making the same, and is particularly concerned with an article of manufacture comprising two pieces of metal secured to each other by a fused mixture of the two metals, and the method of making this article of manufacture.

The objects of my invention are:

First: to provide a new article of manufacture comprising a piece of high speed steel joined or secured to a piece of low speed steel by a fused mixture of the two metals;

Second: to provide a new article of manufacture comprising a head of high speed steel joined to a stem or rod of low speed steel by a fused mixture of the two bodies;

Third: to provide a novel method for uniting pieces of high and low speed steel;

Fourth: to provide a novel method of uniting two pieces of metal;

Fifth: to provide a novel method of uniting two pieces of metal having widely different melting points.

Other objects will appear as this description progresses, reference being had to the accompanying drawings, in which Figure 1 is a side elevation of the mechanism which I use for making one of the articles of manufacture which I manufacture in accordance with my invention;

Figure 2 is an enlarged vertical transverse section taken on a line corresponding to line 2—2 of Figure 1;

Figure 3 is a perspective view of a portion of the upper electrode of my improved mechanism;

Figure 4 is a bottom view of the upper electrode;

Figure 5 is a vertical sectional section through portions of the upper and lower electrodes, and a valve constructed in accordance with my invention, showing certain details of the joint produced by my invention;

Figures 6 to 13 inclusive are more or less diagrammatical views illustrating various ways in which my novel method can be utilized for joining pieces of metal of different shapes and dimensions; Figure 9 being a plan view of the lower electrode shown in Figure 8;

Figures 14, 15 and 16 are views similar to Figures 6 to 9 inclusive, showing the effects of different arrangements of the electrodes relative to the parts to be joined.

Throughout the several views similar reference characters refer to similar parts.

In my co-pending applications Serial No. 138,780, filed December 26, 1916, and Serial No. 209,858, filed January 2, 1918, I have disclosed and claimed a novel article of manufacture comprising a piece of high speed steel joined to a piece of low speed steel by a fused mixture of the two metals and the method of making this article.

Inasmuch as this application constitutes a continuation of the above mentioned applications, I shall first describe my invention as it relates to the manufacture of headed articles, such as valves for internal combustion engines, and especially to valves comprising a head of high speed steel and a stem of low speed steel. As this description progresses it will become apparent that my invention is not in any way limited to the manufacture of headed articles such as that just referred to, but is capable of practically universal application to the joining of two metallic parts.

The exhaust puppet valves of internal combustion engines are frequently raised to red heat during the operation of the engine. Entire valves, head and stem, have been constructed of high speed steel with the object of providing a metal well known to have the property of retaining its hardness even at this high temperature. High speed steel contains a fairly large percentage of tungsten, the range usually being between ten and twenty per cent. These high speed steels also contain chromium to substantially four to five percent. Some high speed steels contain no tungsten, but a percentage of chromium running as high as twelve per cent. Other high speed steels may contain, in addition to this percentage of chromium, five or six per cent. of tungsten. Both chromium and tungsten are expensive, and valves, therefore, having both head and stem constructed of high speed steel are expensive. These valves have been made by an expensive swaging process which is rendered much more difficult if not absolutely impossible with high speed steel which contains a substantial percentage of vanadium, because the vanadium component of high speed steel causes the steel to retain its hardness at a much higher temperature than if the vanadium is omitted.

The conditions under which the stems of puppet valves are operated are not such as to demand the characteristics of high speed steel, but rather are such as to demand the characteristics of carbon steel.

It is my belief that tungsten steel cannot be satisfactorily welded to carbon steel. The wide difference in coefficients of expansion between high speed tungsten steel and carbon steel is a factor in rendering the true welding of the two metals impossible. Still another factor which adds to the difficulties of welding or otherwise uniting high speed steels arises from the fact that tungsten component of high speed steel is so readily oxidized at the welding temperatures of high speed steel that it forms crusts which prevent the union not only of high speed steel with other steels, but of two pieces of high speed steel having exactly the same composition. High speed steels containing chromium are also difficult to unite by welding on account of their chromium content. The exact cause of this is not clearly understood, but chromium appears to make the steel crumbly at high temperatures, and to prevent it from flowing readily.

By my process of fusion hereinafter fully set forth, I am able to unite a disk of high speed steel containing not only tungsten and chromium, but also containing vanadium, to a rod of carbon steel. My process differs radically from the processes heretofore known as welding, the union of the two different metals being made at a temperature far above that ordinarily considered the proper welding temperature for carbon steel.

In accordance with my process of uniting a carbon steel stem to a high speed steel disk one surface of the disk is cooled by means of a copper electrode of large mass capable of absorbing heat very rapidly from that part of the disk with which it contacts, and the carbon steel rod itself is clamped within a copper terminal of large mass capable of rapidly absorbing heat from the carbon steel stem. The fusing operation is brought about by passing an electric current through the carbon steel stem and through the high speed steel disk, the quantity of current being several times as great as that used for electric welding. The entire fusing operation is carried on in less than one second. During this short time substantially five-sixteenths of an inch of the carbon steel stem is actually melted away at the point of contact of the stem with the disk. This melting away of the carbon steel stem results in a spot in the tungsten steel disk being raised to a temperature above the melting temperature of carbon steel. In order to bring about an actual melted condition of the tungsten steel disk without too seriously gasifying the carbon steel stem, the latter is caused to move toward and into the disk during the passage of the electric current through the contacting metals with a pressure of about two thousand pounds per square inch. Since the resistance of the electric circuit is initially highest at the point of contact between the surface of the disk and the end of the stem, this point becomes heated first, and in view of the positive thermal coefficient of resistance of the metals, the points first heated continue to absorb the greater portion of the energy of the electric current used for the fusion operation.

The movement of the stem toward the disk during the passage of current results in the continuous presentation of new and unmelted portions of the stem to a single unchanging portion of the disk. This concentration of the heat finally causes the disk to become melted at the spot of contact with the stem, and the movement of the stem under such high pressure causes an actual mixture of the melted metal of the stem with the melted metal of the disk.

The actual blending of the metals of the disk and stem is materially aided by the fact that the melted stem metal which is squeezed out on all sides from the point of fusion, by the pressure to which the stem is subjected, comes in contact with the cooled copper electrode which holds the stem and immediately hardens into the form of a collar completely surrounding the fusion point. This collar thus hardening prevents the escape of further portions of the melted stem metal, thus compelling it to mingle with the melted portions of the disk metal.

The heat conductivity of tungsten steel is higher than that of ordinary steel, and this, coupled with the fact that the central portion of the reverse face of the disk is in intimate contact with a massive copper electrode, preferably cooled by water and capable of quickly absorbing heat from the under face of the disk, prevents the disk from becoming melted clear through.

The fact that the metals of the stem and disk are blended one into the other so that there is no distinct line, as is the case when metals are welded, prevents the stem and disk from cracking apart due to the difference in expansion and contraction of the two metals.

I have found it advantageous to carry on the above outlined operation in an inert atmosphere. The reason for this is that the tungsten component of high speed steel is very readily oxidized and will, if the operation is carried on in the air, work into the molten metal to such an extent as to weaken the joint.

My improved method of forming valves and other similar articles can, however, be carried out without surrounding the parts to be joined with an inert atmosphere, if the method is skillfully carried through, so that the above mentioned collar forms substantially uniformly on all sides of the union. When not using inert atmosphere I prefer to fuse a slightly longer portion of the stem, so as to form a slightly larger collar at the point of union, to keep the molten metal from flowing out and coming into contact with the air.

The high speed steel which I have found to be most desirable for valve heads contains, besides its iron component, carbon .58%, phosphorus .01%, manganese, trace, silicon .22%, tungsten 17.10%, chromium 4.5%, nickel, .20% and vanadium 1%. High speed steel which contains vanadium is worked, or forged, only with great difficulty, but I have found that by heating the disk to a temperature of between 1450 and 1550° Fahrenheit the disk may be formed into the shape shown in Figure 1 by a single operation. The heat must not be permitted to rise much above 1550° Fahrenheit because at that high temperature the metal, when cooled by contact with the dies for stamping it, becomes somewhat hardened, and in fact so much so that it will not withstand the irregular heat of the fusing operation without cracking. If, however, the temperature to which the disk is raised for the stamping operation is maintained below 1550° Fahrenheit the original annealed condition of the metal is not changed and the metal is not damaged by the heat of the fusion operation.

Before describing my process any further in detail, I shall first describe the apparatus by means of which it is carried out. In my application Serial No. 180,534, filed July 14, 1917, I have described and claimed a mechanism by means of which my process can be carried out, and which is similar in most respects to that illustrated in Figure 1 of my present application. The only difference between the structure disclosed in my co-pending application above referred to and that shown in my present application reside in certain differences in the construction of the electrodes for holding the parts to be joined. This mechanism comprises briefly a suitable supporting standard 25, having parallel guides 26 in which is slidably mounted a block 27, to the lower end of which is secured a massive copper electrode 28. The block 27 has a rack 29 formed in its rear side, which meshes with a gear 30 carried by a shaft 31 at the rear side of the standard 25. A disk 32 is secured to one end of the shaft 31. A lever 33 is secured to the disk and extends forwardly for supporting a weight 34, which is secured to the lever 33 by means of a rod 34′ or any other suitable means. The weight 34 through the lever 33, the shaft 31, pinion 30, and rack 29 exerts a downwardly acting force upon the movable electrode 28.

The reference character 35 indicates the stationary electrode which is formed of massive copper and is insulated from the standard 25 by any suitable means. The electrodes 28 and 35 are connected by a heavy cable 36, which forms the secondary winding of a transformer 37. The yoke 38, secured to the upper side of the movable electrode 28, adjustably receives the screw 39, which acts as a limit stop to determine the extent to which the valve stem 40 will project beneath the clamp of the movable electrode 28, which is indicated as a whole by the reference character 41. The structure which has just been described is the same as that described and claimed in my co-pending application No. 180,534; I shall now describe the novel features of the mechanism which I am at present using for carrying out my process.

Referring to Figures 2, 3 and 4, wherein I have illustrated this novel construction in detail, the reference character 42 indicates a massive copper sleeve which is secured to the electrode 28 by means of the screws 43. The lower end of this sleeve is divided into four quarters by diametrical slots 44 which extend at right angles to each other, thereby providing four clamping tongues. The bore of the sleeve 42 is diminished in diameter from the point 45 to the lower end of the sleeve, so as to provide a plurality of clamping surfaces 46, which alone contact with the valve stem 40, the remaining portions of the valve stem being out of contact with the sleeve 42 and the electrode 28. The purpose of this construction is to confine the current to the lower end of the valve stem, and thereby prevent any useless expenditure of electrical energy by heating the portions of the valve stem extending above the clamping surface 46. A further advantage which results from this construction is that the upper end of the valve stem acts to conduct heat away from the portion of the valve stem clamped between the surfaces 46, which, for a reason which will later be described, is very desirable.

The lower end of the sleeve 42 carries a conical roller bearing race, which is divided into sectors 47 corresponding in angular dimensions to the angular dimensions of the spring tongues of the sleeve 42. These segments are secured to the spring tongues by means of pins 48 which lie in suitable grooves formed in the lower edge of the annular segments of the race, and extend into the spring tongues as shown in Figure 2. A sleeve 49 provided with external screw threads 50 is secured to the outside of the electrode sleeve 42 by means of set screws 51. A clamping sleeve 52 having internal screw threads co-acting with the screw threads 50 is provided at its lower end with a shoulder 53 which supports a conical roller race 54 that co-acts with the race 47 to support the roller bearings 55. The race 54 is secured to the sleeve 52 by means of set screws 56. The reference characters 57 and 58 indicate the upper and lower members of a cage for the roller bearings 55. Inasmuch as the details of this cage form no part of my present invention, they will not be described in detail. A bar of iron 60 is passed about the sleeve 52 and clamped thereto by means of a bolt 61, one end of the bar being allowed to project to form a handle 62, by means of which the sleeve 52 can be rotated about the sleeve 49. When the sleeve 52 is rotated in one direction it carries the race 54 upwardly and through the roller bearings causes the lower ends of the spring tongues of the sleeve 42 to be sprung inwardly against the stem 40 and clamped thereto, and when the sleeve 52 is rotated in the opposite direction, the race 54 moves away from the roller bearings 55 and allows the spring tongues to spring outwardly, thereby releasing the stem 40.

The lower electrode 35 is provided with a massive upwardly extending projection 63, which is secured to the electrode 35 by any suitable means, such as screws 64, passing through suitable lugs 65 formed on the part 63. The part 63 of the lower electrode is provided with a bore 66, which is reduced in diameter at its lower end and provided with screw threads 67. A plug of metal 68 is slidably mounted in the upper portion of the bore 66 and insulated therefrom by means of a sleeve of mica 69, which has a bottom portion 70 that insulates the plug from the steel disk 71 that rests upon the upper end of a screw 72 which co-acts with the threads 67 of the smaller portion of the bore 66. The lower end of the screw 72 is provided with a lever arm 73 by means of which it can be adjusted. The upper end of the plug 68 is tapered as shown at 74.

Having thus described the mechanism which I employ for manufacturing headed articles in accordance with my present invention, I shall now continue to describe the process of forming these headed articles. The disks or valve heads 75 are sandpapered or otherwise brightened on both the upper and lower sides of the central flattened portion, and near the periphery of the concave side, and placed upon the upper flat side of the part 63 of the lower electrode. The stem 40 has its lower end slightly beveled and is then placed in the upper electrode and clamped in the manner described above, the screw 39 having been previously adjusted to cause the lower end of the stem to project beyond the lower end of the upper electrode the desired amount. The bevel 76 given to the lower end of the valve stem, as illustrated in Figure 2, is exaggerated for the purpose of illustration. In practice I find that this bevel should preferably be from three to eight degrees, the angle being measured from the flattened end of the valve stem. The upper electrode is then lowered until the lower end of the valve stem rests upon the upper side of the head and the screw 72 is adjusted until it is spaced from the lower side of the central portion of the head a distance of approximately three thousandths of an inch. The primary of the transformer is then closed by means of a suitable switch and the weight 34 is allowed to exert a downward pressure upon the valve stem.

Although the entire time during which the current flows through the lower end of the stem and the valve head is but a small fraction of the time which has hitherto been used in welding metals by means of electricity, the result of this current is, firstly, to heat the head of the valve through substantially its whole surface to a somewhat dull red, thus softening it sufficiently to cause the disk to be deflected under the pressure from the stem, so that the lower central surface of the disk comes into contact with the plug 68. Immediately following this initial deflection of the head or disk the carbon steel stem and the upper surface of the tungsten steel disk in immediate contact with the stem become heated to such a temperature that the carbon steel stem is actually melted and slightly gasified at the point of contact with the disk. The stem, however, being held under pressure against the disk, melts away at the point of contact with the disk, the molten metal being squeezed out at the sides in the form of a collar.

Although almost from the beginning of the current flow the carbon steel stem is heated to melting temperature, the tungsten steel disk is not initially raised to the melting temperature of tungsten steel. It is only after the carbon steel stem has been fed under pressure toward and into the tungsten steel disk for a distance of about five-sixteenths of an inch that the temperature of the tungsten steel disk is raised to its melting point. By the time the tungsten steel disk has been raised to its melting point, a collar of carbon steel cooled by contact with the upper copper electrode, as shown in Figure 5, is formed around the point of fusion, so that the molten metal of the disk cannot readily escape and is caused to mix with the molten metal of the stem.

In Figure 5 the area of blending of the two metals is illustrated by an overlapping of the cross-section lines of the stem and disk. This molten metal is somewhat mechanically stirred by the pressure and movement of the stem, and sections actually cut through completed valves show that the two metals are intimately mixed throughout a thickness of substantially one-eighth of an inch, the characteristics of the tungsten steel disk being more prominent in the portions nearest the disk, and the characteristics of the carbon steel stem being more prominent in the portions nearest the stem.

The steel head at and very close to the margin of the fusion comes out of the operation extremely hard and brittle. In order to prevent cracking of the disk around the fused portion, the now united members are annealed by packing in charcoal, or some other non-oxidizing packing which excludes the air, and by being held at a temperature between 1525 and 1550° Fahrenheit for a period of one hour, and then gradually cooling down to about 200° Fahrenheit throughout a period of two or three hours. When thus annealed, such internal strains as were created during the fusing operation are permanently relieved.

In order that the valves may be rotated for "grinding in" and for re-grinding during service, a small slot, illustrated at 9 in Figure 5, is milled into the base of the concave part of the head. The valves are then turned in a lathe or other special machine to within a few thousandths of the size at which they are to be used. The machined valves are then heated, preferably in an electric furnace, to a temperature of between 2000 and 2150° Fahrenheit. It is desirable that the periphery of the valve head be hardened to a greater extent than is the central portion of the head. In order to accomplish this hardening of the periphery, it must be cooled more rapidly than the central portion of the disk, and in fact more rapidly than the carbon steel stem, because it is desirable that the stem itself be maintained quite soft and tough. In order to satisfactorily cool the periphery of the disk, I mount the heated valve between centers so that it may be rather rapidly rotated. At the same time I apply a blast of cold air to the periphery of the valve head.

After the valve is thus finally tempered, it is ground to exact size. I find it preferable to remove about five-thousandths of an inch of the metal around the seating portion of the valve because a skin of substantially this thickness, which is not hardened to the same extent as the inner portions of the metal, covers the entire tungsten steel disk.

When this skin has been removed, the high speed tungsten steel presents a very hard surface and one which retains its hardness even at a red heat.

Valves constructed in this manner are lighter than valves made in whole of high speed tungsten steel. Furthermore, by using steel containing a small percentage of vanadium, the valve may be operated at a temperature higher than the temperature at which valves constructed in whole of high speed steel can be operated. I am not aware that any one has heretofore constructed a valve entirely of high speed steel containing vanadium.

The plug 69 performs two important functions, firstly, it prevents the disk from being deflected any further after its initial deflection, and secondly, after the disk is deflected so as to contact with the plug, the plug rapidly conducts heat away from the lower side of the disk, and thereby prevents the lower side of the disk from being raised to the fusing temperature and fused entirely through.

In Figures 6 to 13 inclusive I have disclosed different types of apparatus which are especially adapted for the efficient and expeditious carrying out of my process as applied to different kinds of materials and materials of varying dimensions, for while it is possible to join a variety of articles by means of the apparatus and process just described, if sufficient care is exerted in carrying out the process, as good results may be obtained by an unskilled operator by the use of the apparatus which I am about to describe.

In Figure 6 I have illustrated the means which I prefer to employ for joining valve stems of low carbon steel to heads of high speed steel which are comparatively thick. It will be noted that the portion 63 of the lower electrode 35 has a central projecting portion 80 which takes the place of the plug 68, shown in Figure 2. This portion 80 is formed integrally with the part 63 of the lower electrode and when the head or disk of the valve is deflected against this portion current not only flows from the central portion of the head to the peripheral portions thereof, but also passes straight through the head from the stem to the upwardly extending portion 80. This results in a deeper fusion of the metal of the head than with the use of apparatus such as that shown in Figure 2, wherein no current flows from the stem to the plug. At the same time the upwardly extending portion 80 cools the lower side of the disk or head sufficiently to prevent it being fused entirely through.

The apparatus shown in Figure 7 is similar to that shown in Figure 2, and is illustrated merely to form a comparison between the results produced by this apparatus and that shown in Figure 6.

In Figure 8 I have illustrated apparatus which I find to be useful in making valves having heads thicker than that shown in Figure 6. In this construction the plug 68 is not insulated from the part 63 of the lower electrode, but is in electrical contact therewith, and can be shifted upwardly and downwardly by means of the screw 72. With such a construction the plug 68 can be adjusted so as to insure that the disk will be heated up to a red heat before it will be deflected into contact with the plug 68. This is of importance for reasons which will later be explained. As soon as the disk is deflected into contact with the plate 68 current will flow directly through the disk from the stem to the plug 68 and will consequently cause a comparatively deep fusion of the metal of the head.

In Figures 9 and 10 I have illustrated the apparatus which I prefer to use in joining very thin disks of metal to a rod or stem. In joining two pieces of this character there is considerable danger of the disk being fused entirely through. This results from the fact that by reason of the thinness of the disk it does not have sufficient current carrying capacity at the region adjacent the sides of the stem and it is melted through at this point before the joint is completed. To prevent this I use a lower electrode similar to that shown in Figure 6, and in addition thereto place a plurality of small pieces 81 of sheet iron or sheet steel upon the upper surface of the part 63 of the electrode at points where they will support the periphery of the disk. The resistance offered by these small pieces of sheet metal is sufficient to cut the current flowing through the disk from the central portion to the periphery thereof down to such a degree as to prevent the entire melting through of the disk at its central portion. The disk, however, becomes heated to a sufficient degree to permit it to be deflected into contact with the portion 80 of the electrode, whereupon part of the current used for fusing the disk will flow directly from the stem to the electrode.

In Figure 11 I have illustrated means for joining a rod of low speed steel to a rod of high speed steel. In performing this operation a clamping means 41' similar to the clamping means 41 may be used for clamping the rod held by the lower electrode. The reference character 82 indicates the rod of high speed steel and the reference character 83 the rod of low speed steel. It will be noted that the rod of high speed steel projects further from its electrode than the rod of low speed steel projects from its electrode. The reason for this is that it is necessary to conduct the heat away from the rod of low speed steel at a faster rate than from the rod of high speed steel, in order to prevent the former from melting before the rod of high speed steel is heated up to the fusing point. In carrying out this process I prefer to bevel the contacting ends of both rods, the bevel of the low speed steel rod being greater than that of the high speed steel rod, but the operation can be successfully performed by beveling but one of these rods. The bevel illustrated is an exaggerated one, and in practice will not amount to more than six or eight degrees.

In Figure 12 I have illustrated the manner in which two pieces of metal having the same melting point may be joined together by my novel process. In carrying out this process the two pieces of metal may be held by means of electrodes similar to those shown in Figure 11, but in this case the two pieces of metal to be joined will project substantially equal distances beyond the ends of their respective electrodes. Where the metals are of such character as to require an extremely high current strength to cause their fusion, one of both of the parts are preferably beveled at their contacting surfaces to insure the fusion of the central portions of the two pieces of metal. At this point I might explain that the purpose of beveling the contacting ends of the different pieces of metal in all cases is to initially confine the current to the central portions of the parts to be united. This has been found advisable in practice for the reason that there seems to be a tendency for the fusion to take place adjacent the outer sides of the parts to be joined before the inner portions thereof become sufficiently fused. This is probably due to the fact that with such heavy currents there is mutual repulsion between the parallel portions of the flow of current which tends to crowd the current to the outer portions of the different pieces of metal through which it flows. By beveling the contacting ends of these parts or one of them, the current is necessarily initially confined to the central portions of the parts and cannot flow through the outer portions until the central portions have been fused to thereby bring the outer portions into contact.

In Figure 13 I have illustrated means whereby spot welding can be accomplished by my process. In this figure the reference characters 84 and 85 represent two sheets of metal to be united and the reference characters 86 indicate spot welds formed by means of my process. Where the two sheets of metal are made of metals having widely different melting points, it is necessary to provide means for conducting the heat away from the metal having the lower melting point at a rate sufficient to prevent it from being completely melted through before the metal of the other sheet has reached its fusing point. In spot welding low carbon steel to tungsten steel I make one of the electrodes 87, which conducts the current to the metals, of copper, preferably water cooled, this electrode contacting with the sheet of low carbon steel. The other electrode I preferably form of tungsten or of steel, these metals having a much lower heat conductivity than copper, and consequently permitting the temperature of the high speed steel to build up rapidly at the point where it contacts with the carbon steel.

In Figures 14, 15 and 16 I have illustrated more or less diagrammatically means whereby I can control to some extent the depth and shape of the fusion in the high speed steel. In Figure 14 it will be noted that the disk is in contact with the lower electrode at the periphery only of the disk. With such an arrangement all the current must pass in the direction of the arrows; that is, from the rod or stem toward the periphery of the disk, and as a result of the current taking this path the high speed steel is fused deeper adjacent the edges of the rod or stem than at the central portion thereof, giving a line of weld similar to that shown in this figure.

In Figure 15 the disk is supported at its central portion only and the current flows directly through the disk from the stem to the lower electrode. With such an arrangement there appears to be a tendency for the fusion to take place faster at the central portion of the disk than at points immediately adjacent the edges of the rod or stem, and as a result the line of weld is convexed downwardly as shown in this figure.

By the arrangement shown in Figure 16, which combines the features of the apparatus shown in Figures 14 and 15, the current not only flows from the rod or stem to the periphery of the disk, but also flows directly across the disk from the stem to the lower electrode, whereby the effects of the apparatus shown in Figures 14 and 15 are combined to produce a substantially straight line of fusion except at the ends of this line where it curves upwardly to meet the upper side of the disk.

In the above description of my process I have referred to the fact that sufficient current flows through the head or disk to heat it up to substantially a dull red heat. My purpose in doing this is to eliminate the formation of more or less circular cracks in the disk adjacent the stem or rod, caused by the uneven contraction of the central and outer portions of the disk by the cooling of the central portion thereof. As described above, the central portion of the disk is heated to its fusing point. If the outer portion of the disk was to remain practically cold when the central portion thereof would cool, it would contract and separate from the outer portion forming substantially circular cracks at points adjacent the stem or rod. By heating the disk up to a red heat the strains set up in the disk during the cooling operation will be able to adjust those portions of the disk adjacent the stem to relieve the strains imposed thereon by the cooling of the central portion. I prefer to quickly transfer the valves or other articles formed by my process to a box containing Sil-o-Cel or powdered mica or any other material having good insulating qualities, and burying the valve or other article in this insulating material so as to cause the article to cool off very gradually, whereby all portions of the valve are given sufficient time to adjust themselves to the strains set up therein during the cooling process. I usually keep the insulating material in a metal box and keep a gas burner burning thereunder in order to keep the insulating material hot, so as not to chill the newly formed article when placed therein.

In joining a disk of high speed steel containing approximately eighteen percent. of tungsten and which is five thirty-seconds of an inch thick and one and fifteen-sixteenths inches in diameter to a nickel steel stem five-eighths of an inch in diameter, I use a current of approximately thirty thousand amperes, and pressure of from one to two thousand pounds. While it is possible to produce a very satisfactory joint under the above conditions by allowing the current to flow approximately one second, I prefer to continue the flow of current about three seconds, as this permits the heat to spread over practically the entire rod or disk so that it is entirely red hot when removed from the machine. During such an operation as above described, about one-fourth inch of the stem or rod is fused and squashed out around the stem forming the collar above referred to.

In joining a stem or rod eleven-sixteenths of an inch in diameter to a disk two and one-half inches in diameter and five thirty-seconds of an inch thick, the disk being made of tungsten steel containing about five percent. of tungsten, I preferably use a little more than thirty thousand amperes and allow the current to flow through the contacting surfaces for approximately two seconds. The reason for the quicker time of fusion in this case is probably that since the tungsten steel contains a smaller percentage of tungsten than in the previous case it does not require so much heat to heat it up to its fusing temperature. In both of the cases just enumerated the end of the stem or rod which contacts with the disk is beveled from three to six degrees.

In joining materials having a lower point of fusion than tungsten steel, somewhat less current per unit area should be used than that described above, but in all cases the time should be comparatively short so as to prevent as much as possible the radiation of heat from the parts immediately adjacent the joint and to raise the contacting parts to the fusing temperature before the heat created at this point has time to heat the adjacent portions to any considerable extent. The quicker the operation is performed the greater the amount of current per unit area it is necessary to employ.

While I have described my invention as relating to the joining of several different kinds of material and to articles of different shape, it is to be understood that it is capable of other and general application to the joining of various metal articles irrespective of their shape and of the fusing points of the metals of which the different articles may be formed. It should also be understood that my invention can be carried out by means of apparatus other than that described herein, it only being essential that the apparatus is capable of conducting large quantities of current to the parts to be joined, and in some cases including means for cooling various parts of the articles to be joined in a manner analogous to that described above.

Having thus described my invention, what I claim is:

1. The process which consists in heating a small portion of a disk of high speed steel to its melting temperature, and pressing into the pool of molten metal a rod of carbon steel having a lower melting temperature.

2. The process which consists in passing an electric current through the contact between a piece of tungsten steel and a piece of carbon steel, feeding the two pieces together under pressure until a substantial quantity of tungsten steel is heated to its melting temperature, and the metals have united and then interrupting the flow of electric current.

3. The method of making valves which consists in backing a thin disk of steel by a massive copper electrode, clamping a stem at a point near its end in another electrode, pressing the stem against the disk opposite the first electrode and passing an electric current through the electrodes, stem and disk, at the same time keeping the first electrode cool to prevent the disk from being melted clear through, and keeping the second electrode cool to concentrate the heat at the end of the stem.

4. The process of making valves which consists in forming sheet metal into a cupped valve head, placing the concave side of the cupped head over an electrode so shaped that the cup touches the electrode in a substantial annulus remote from the center of the cup, pressing a stem against the outside central portion of the cup with a pressure sufficient to deflect the red hot cup into central contact with the electrode but insufficient to deflect a cold cup to that extent, passing an electric current through the stem and cup to heat the latter at points remote from the center, deflecting the center into contact with the electrode, fusing the stem and external portions of the cup while still maintaining the pressure sufficient for the deflection of the cup into central contact with the electrode and interrupting the current before the pressure has been relieved.

5. The process of making valves for internal combustion engines which consists in preheating a disk by passing an electric current radially through it and thereafter fusing a stem to the preheated portion of the disk by passing an electric current transversely through the disk and axially through the stem and simultaneously conducting the heat away from the surface of the disk opposite the stem to prevent the disk from becoming fused clear through.

6. The process of securing a stem of low speed steel to a head of high speed steel which comprises blending the stem of low speed steel into the head of high speed steel by a fused mixture of the two metals.

In witness whereof, I hereunto subscribe my name this 7th day of February, 1919.

CARL PFANSTIEHL.

Witnesses:
MARY FAE PETRIE,
ROBERT F. BRACKE.